United States Patent
Dieringer

Patent Number: 6,033,039
Date of Patent: Mar. 7, 2000

[54] ELECTRONICALLY CONTROLLED BRAKING SYSTEM

[75] Inventor: Werner Dieringer, Vallendar, Germany

[73] Assignee: Lucas Industries public limited company, United Kingdom

[21] Appl. No.: 09/196,846

[22] Filed: Nov. 20, 1998

Related U.S. Application Data

[63] Continuation of application No. PCT/EP97/02578, May 22, 1996.

[51] Int. Cl.$^7$ .............................. B60T 8/44; B60T 8/42; B60T 8/34

[52] U.S. Cl. .................................... 303/114.3; 303/115.3; 303/113.3

[58] Field of Search .................................. 303/31, 114.3, 303/115.3, 113.2, 113.3

[56] References Cited

U.S. PATENT DOCUMENTS

| | | | |
|---|---|---|---|
| 5,178,441 | 1/1993 | Heibel et al. | 303/114.3 |
| 5,350,225 | 9/1994 | Steiner et al. | 303/114.3 |
| 5,513,906 | 5/1996 | Steiner | 303/114.3 |

FOREIGN PATENT DOCUMENTS

| | | |
|---|---|---|
| 706 924 A1 | 9/1995 | European Pat. Off. . |
| 39 43 002 A1 | 7/1991 | Germany . |
| 40 28 290 C1 | 1/1992 | Germany . |
| 41 02 496 A1 | 2/1992 | Germany . |
| 44 36 297 A1 | 4/1996 | Germany . |
| 195 14 591 A1 | 10/1996 | Germany . |
| 19514591 A1 | 10/1996 | Germany . |
| WO 96/06763 | 3/1996 | WIPO . |
| WO 96/31374 | 10/1996 | WIPO . |
| WO 96/34783 | 11/1996 | WIPO . |

Primary Examiner—Christopher P. Schwartz
Assistant Examiner—Robert A. Siconolfi
Attorney, Agent, or Firm—MacMillan, Sobanski & Todd, LLC

[57] ABSTRACT

In an electronically controllable braking system for motor vehicles with a brake pressure generator unit which comprises a master cylinder for generating a brake pressure, a brake pedal via which an actuation force can be introduced into the brake pressure generator unit for actuating the brake pressure generator unit, an electronically controllable brake booster, either for amplifying the actuation force introduced via the brake pedal for the actuation of the brake pressure generator unit, or for effecting an actuation of the brake pressure generator unit, as well as sensors which sense the brake pressure generated by the brake pressure generator unit and a parameter for an electronic control unit, which is related to the amplification of the electronically controllable brake pressure booster, there is provided, in order to comply with a very high safety standard at relatively low cost expenditures, that the electronic control unit determines the actuation force which is introduced via the brake pedal from the brake pressure generated by the brake pressure generator unit and the parameter which is related to the amplification of the electronically controllable brake booster. This results in the advantage that the actuation force which is introduced via the brake pedal can be determined reliably and safely without necessitating the employment of a force sensor.

18 Claims, 1 Drawing Sheet

ELECTRONICALLY CONTROLLED BRAKING SYSTEM

CROSS REFERENCE TO RELATED APPLICATIONS

This application is a continuation of International Application No. PCT/EP97/02578, which claims priority from German Patent Application No. DE 19620540.9, filed May 22, 1996.

BACKGROUND OF THE INVENTION

The invention relates to an electronically controllable braking system for motor vehicles comprising a brake pressure generator unit with a master cylinder, for generating a brake pressure, a brake pedal via which an actuation force can be introduced into the brake pressure generator unit for actuating the brake pressure generator unit, an electronically controllable brake booster for either amplifying the actuation force introduced via the brake pedal for the actuation of the brake pressure generator unit or for effecting an actuation of the brake pressure generator unit, as well as sensors which sense the brake pressure generated by the brake pressure generator unit and a parameter for an electronic control unit, which is related to the amplification of the electronically controllable brake pressure booster.

From DE 40 28 290 C1 a method for shortening of the braking distance in critical driving situations is known wherein the actuation speed of the brake pedal as caused by the driver is utilized in its respective position as the sole criterion for initiating an automatic braking operation. In the electronically controllable braking system described therein, a comparison is made between the actuation speed of the brake pedal in its respective position as caused by the driver and a constant threshold value, and depending on the result of the comparison, the emergency braking operation is initiated or not.

The method described in DE 40 28 290 C1 is disadvantageous in that only the actuation speed of the brake pedal as caused by the driver is utilized as the criterion for initiating an automatic braking operation. The actuation speed of the brake pedal is obtained by the derivative of the actuation travel of the brake pedal with respect to times Due to the fact that the actuation travel includes a non-negligible lost motion caused by backlash in the actuation mechanism, the utilisation of the actuation speed of the brake pedal as the sole criterion for initiating an automatic braking operation calls for improvement. Due to the backlash, for example, an unintentional slight touching of the brake pedal might be sufficient to initiate an automatic braking operation, which, however, in this case could result in a dangerous driving situation.

From DE 41 02 496 A1 a brake pressure control device is known wherein the brake pressure generated in the hydraulic brake circuit is measured as a parameter which is related to the actuation force applied to the brake pedal, in order to block the brake circuit in which the increased brake pressure was measured if a threshold value is exceeded.

In addition, an electronically controlled brake booster is proposed in DE 44 36 297 A1, wherein a sensor designed as a pressure sensor senses at least the pressure which prevails in the working chamber of the brake booster.

The braking systems described in DE 41 02 496 A1 and DE 44 36 297 A1 indirectly utilize the actuation force applied to the brake pedal as the criterion initiating an automatic braking operation, which force is determined according to DE 41 02 496 A1 via the brake pressure generated in the hydraulic brake circuit and according to DE 44 36 297 A1 via the differential pressure which acts at the movable wall of the brake booster. While the actuation force applied to the brake pedal is a more reliable and thus a safer criterion for initiating an automatic braking operation compared to the actuation travel, there is, nevertheless, the great disadvantage that the actuation force cannot be determined during the automatic braking operation.

In the case of automatic braking operations, a distinction must be made between those which are effected independent of an actuation of the brake pedal, in order to perform, for example, a driving dynamics control operation or an antislip control operation, and those which intensify an actuation of the brake pedal, in order to perform, for example, an emergency braking operation or an intentional braking operation, respectively. Under safety aspects, it is of decisive importance that the actuation force can be determined during the automatic braking operation as well. As an example, reference is made to a driving dynamics control where an automatic braking operation is effected independent of an actuation of the brake pedal in order to improve the stability of the motor vehicle, in particular, during cornering. If, during the driving dynamics control operation, the brake pedal is actuated, the driver's request must be evaluated in order to decide whether the driving dynamics control is to be continued or to be aborted and an emergency braking operation or an intentional braking operation, respectively, is to be performed. For the evaluation of the driver's request the actuation force represents a very reliable and safe criterion.

At first sight, it therefore appears obvious to employ a force sensor in order to sense the actuation force at the brake pedal permanently, i.e. also during an automatic braking operation. There is, however, the major drawback that a force sensor which is suited for this application is commercially available only at a considerable cost expenditure. It is also disadvantageous that such a force sensor must be integrated into the brake pedal or the actuation mechanism, respectively, which entails considerable technical efforts.

In view of this, the invention is based on the object to improve an electronically controllable braking system of the initially mentioned type with respect to the above-mentioned drawbacks in order to meet a very high safety standard at a relatively low cost expenditure.

SUMMARY OF THE INVENTION

The object is solved in that the electronic control unit determines the actuation force which is introduced via the brake pedal from the brake pressure generated by the brake pressure generator and the parameter which is related to the amplification of the electronically controllable brake booster. This results in the advantage that the actuation force which is introduced via the brake pedal can be determined reliably and safely without necessitating the employment of a force sensor.

Due to the fact that the electronically controllable brake booster (21) can comprise at least one movable wall (22) which can be subjected to a differential pressure ($dp_{47}$), there is the advantage that the parameter ($dp_{47}$) which is related to the amplification of the electronically controllable brake booster (21) can be the differential pressure ($dp_{47}$) which is applied to the movable wall.

Due to the fact that the electronic control unit determines the actuation force which is introduced via the brake pedal taking into consideration the working surface of the master cylinder and the working surface of the movable wall, it is found to be particularly advantageous to determine the introduced actuation force according to simple formula because the working surface of the master cylinder onto which the brake pressure generated in the master cylinder is acting, and the working surface of the movable wall which is subjected to the differential pressure are known and generally not varying system parameters. Thus, the total brake power as provided by the brake pressure generator unit can be determined from the working surface of the master cylinder and the brake pressure generated in the master cylinder. In addition, the brake pressure proportion which is generated by the electronically controllable brake booster can be determined from the working surface of the movable wall and the differential pressure applied to the movable wall. The actuation force which is introduced via the brake pedal is therefore obtained by subtracting the brake pressure proportion which is generated by the electronically controllable brake booster from the total brake power provided by the brake pressure generator unit.

Due to the fact that the electronic control unit can include at least one correction value and/or at least one correction factor in the determination of the actuation force which is introduced via the brake pedal, the advantage is obtained that interference influences arising from friction, inertia and tension forces can be compensated in a simple manner, which results in a higher accuracy of the determination of the actuation force which is introduced via the brake pedal.

Due to the fact that the electronic control unit continuously determines the actuation force which is introduced via the brake pedal there is the advantage that the actuation force which is introduced via the brake pedal cannot only be utilized as the criterion for initiating an automatic braking operation, e.g. an emergency braking operation or an intentional braking operation, respectively, but also ensures a detection of the driver's request, in particular during an automatic braking operation, e.g. a driving dynamics control operation.

Due to the fact that the electronic control unit evaluates the actuation force which is introduced via the brake pedal in order to decide whether a driving dynamics control operation is to be continued or whether the driving dynamics control operation is to be aborted and an emergency braking operation or an intentional braking operation, respectively, is to be carried out, a very high degree of safety is obtained.

BRIEF DESCRIPTION OF THE DRAWING

The invention together with further advantages will be explained in detail by means of a drawing, in which.

DETAILED DESCRIPTION OF THE PREFERRED EMBODIMENT

Figure 1:
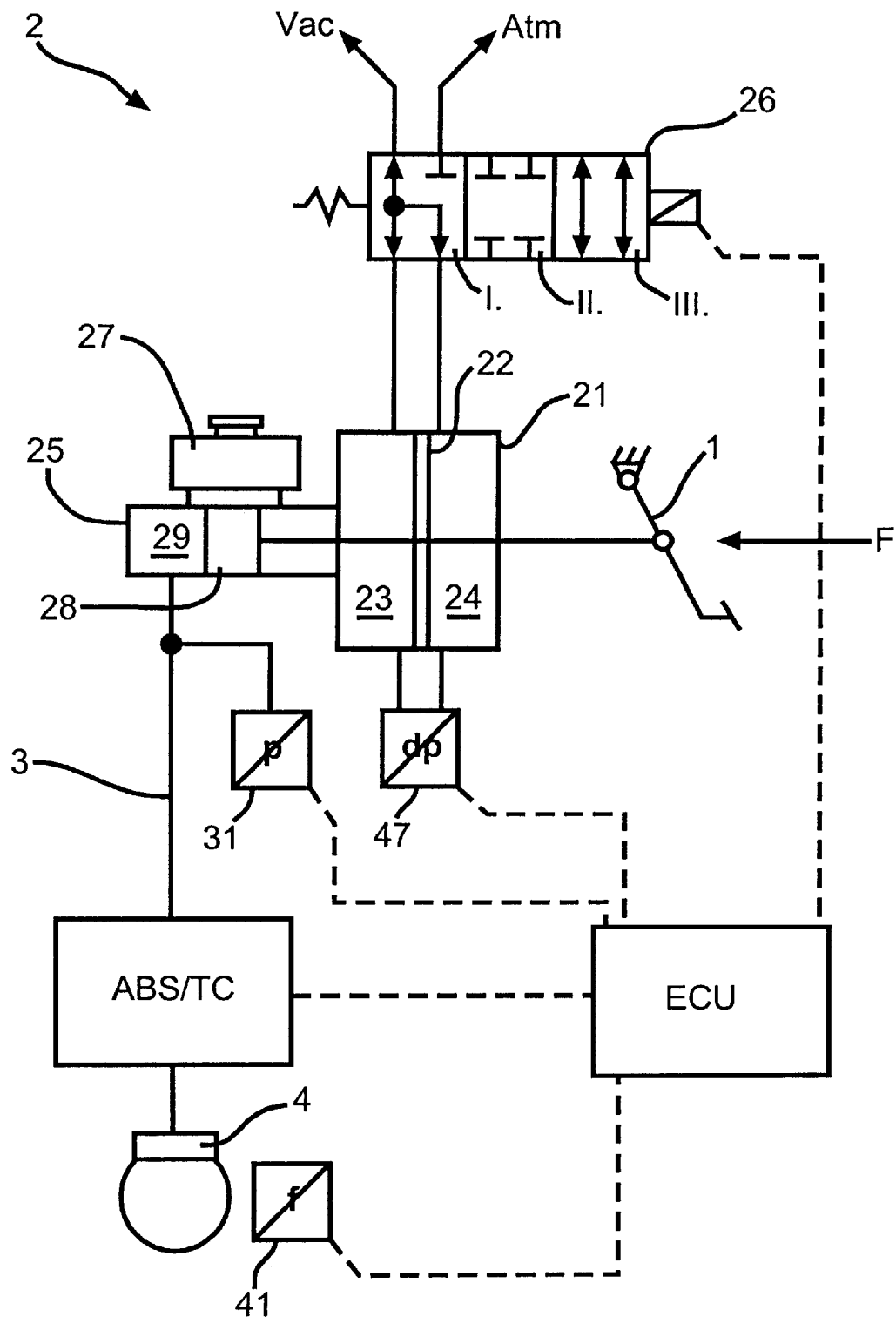
FIG. 1 schematically shows an inventive embodiment of an electronically controllable braking system for motor vehicles.

In the braking system according to FIG. 1 a brake pedal 1 serves to actuate a brake pressure generator unit 2. The brake pressure generator unit 2 comprises a master cylinder in which a piston 28 forms a pressure chamber 29. The pressure chamber 29 is supplied with brake fluid from a reservoir 27. A brake line 3 leads from the pressure chamber 29 to a wheel brake 4 of the motor vehicle.

An antilock and/or antislip control device ABS/TC is arranged in the brake line 3 between the brake pressure generator unit 2 and the wheel brake 4. The antilock and/or antislip control device ABS/TC comprises in a known manner, among other things, valve and pump arrangements which are controlled by an electronic control unit ECU in order to modulate the pressure in the wheel brake 4. This is effected as a function of the rotational behaviour of a vehicle wheel associated with the wheel brake 4, which is sensed by means of a sensor 41 and supplied to the electronic control unit ECU.

The brake pressure generator unit 2 comprises a brake booster 21 for the amplification of the actuation force F which is introduced via the brake pedal 1. A movable wall 22 divides the pneumatic brake booster 21 into a vacuum chamber 23 and a pressure chamber 24. For the generation of the vacuum the vacuum chamber 23 is connected with a vacuum source Vac which is not shown in detail. In a motor vehicle equipped with an Otto engine the vacuum which is inherently generated in the intake pipe is available as the vacuum source Vac. In the case of a motor vehicle which is driven by a Diesel engine or an electric motor, however, an additional vacuum pump is required as the vacuum source Vac. Upon an actuation of the brake pedal 1 the brake booster 21 operates in a known manner in such a way that the pressure chamber 24 is subjected to atmosphere Atm so that a differential pressure $dp_{47}$ acts upon the movable wall which amplifies the actuation force F which is introduced via the brake pedal 1. In the non-actuated condition the vacuum chamber 23 and the pressure chamber 24 are connected with each other and therefore pressure-balanced so that no differential pressure $dp_{47}$ is effective at the movable wall 22.

The brake booster 21 is also electrically controllable via an electromagnetically operated control valve arrangement 26. For this purpose the control valve arrangement 26 which is shown here in an idealized manner as a ¾-way valve can be brought into different control positions I., II. and III.;

a first so-called basic or relief position I., in which the vacuum chamber 23, the pressure chamber 24 and the vacuum source Vac are connected with each other, with the connection to atmosphere Atm being blocked, so that a differential pressure $dp_{47}$ which acts upon the movable wall 22 is relieved or reduced, respectively, via a pressure compensation process; or a second so-called holding position II., in which the connections with the vacuum chamber 23, the pressure chamber 24, the vacuum source Vac and atmosphere Atm, respectively, are blocked so that a differential pressure $dp_{47}$ which prevails at the movable wall is maintained; or a third so-called build-up position III., in which the vacuum chamber 23 is connected with the vacuum source Vac only, and the pressure chamber 24 is connected to atmosphere Atm only, so that a differential pressure $dp_{47}$ which prevails at the movable wall 22 is built up or increased, respectively.

The capacity of the brake booster 21 to be electrically controlled enables braking operations to be also carried out automatically, i.e. independent of an actuation of the brake pedal 1. This serves for example for carrying out an emergency braking operation or an intentional braking operation, respectively, as well as braking operations for an antislip control or driving dynamics control or vehicle-to-vehicle ranging control.

For this purpose, the electric control unit ECU measures characteristic parameters for the operating conditions of the braking system and evaluates same in order to effect the electrical control of the control valve assembly 26 as a function of same by means of current, voltage or pulse width modulation signals corresponding to the control positions I., II. and III.

For sensing the operating conditions of the braking system a sensor means 47 is provided which senses the differential pressure $dp_{47}$ prevailing at the movable wall 22 which results from the pressure $p_{23}$ in the vacuum chamber and the pressure $p_{24}$ in the pressure chamber. For this purpose, the sensor means 47 is arranged, for example, at or within the movable wall 22. Due to the fact that such a measurement of the differential pressure $dp_{47}$ is independent of variations of the ambient pressure, the evaluation of the measuring signal becomes simpler. Alternatively, there is, however, also the possibility to employ two pressure sensors at or within a stationary wall of the brake booster 21, which sense the pressure $p_{23}$ in the vacuum chamber 23 and the pressure $p_{24}$ in the pressure chamber 24 separately. In this case two measuring signals are transmitted to the electronic control unit ECU where the differential pressure $dp_{47}$ which is required for the further evaluation is determined according to the simple relation $$dp_{47}=p_{24}-p_{23}.$$

The driver's request which is introduced via the brake pedal 1 is particularly characteristic for the evaluation of operating conditions of the braking system. For the detection of the driver's request, a sensor means is usually provided which senses the actuation travel of the brake pedal 1 and transmits it to the electronic control unit ECU. It is then possible to derive the actuation speed of the brake pedal 1 from the actuation travel, which serves as the criterion for initiating an emergency braking operation or an intentional braking operation, respectively. A sensor means for sensing the actuation travel of the brake pedal 1 is, however, not necessarily required in the braking system as shown in FIG. 1 because upon an actuation of the brake pedal 1, the movable wall 22 is displaced in an axial direction which results in a change of the differential pressure $dp_{47}$ which acts upon the movable wall 22. The driver's request which is introduced via the brake pedal 1 can therefore be derived from the differential pressure $dp_{47}$ in a simple manner. After the initiation of an emergency braking operation or an intentional braking operation, i.e. under the electric control of the control valve arrangement 26, however, it is no longer possible to quantitatively deduct the driver's request.

In lieu of the actuation travel of the brake pedal 1, the actuation force F which is introduced by the driver via the brake pedal 1, is a more reliable parameter for the detection of the driver's request because the acuation travel of the brake pedal 1 includes a non-negligible lost motion due to a mechanical backlash in the actuation mechanism. Due to this lost motion, an unintentional slight touching of the brake pedal 1 might be sufficient to initiate an emergency braking operation or an intentional braking operation, respectively, which in this case could result in a critical driving situation.

It is further advantageous to sense the driver's request as the actual actuation force F which is introduced via the brake pedal 1, in that a reliable parameter for the brake power proportion requested or applied by the driver is available for evaluation in the electronic control unit ECU. This is of particular importance for the evaluation of so-called mixed braking operations in which the brake pressure generator unit 2 is mechanically actuated by the driver and at the same time electrically activated via the control valve arrangement 26.

A direct sensing of the actuation force F which is introduced by the driver via the brake pedal 1 requires a separate force sensor which is arranged at or within the brake pedal 1. A force sensor which is suitable for this application, however, results not only in procurement problems but also in considerable costs.

In addition, a sensor means 31 is provided which senses the brake pressure $p_{31}$ which is generated in the pressure chamber 29 and introduced into the brake line 3, and transmits it to the electronic control unit ECU. The brake pressure $p_{31}$ or its time-dependent variation represents a measure for the total brake power which is provided by the brake pressure generator unit 2 for vehicle deceleration.

Thus, the total brake power provided by the brake pressure generator unit 2 is obtained from the brake power proportion in the form of the actuation force F introduced by the driver and the brake power proportion which is additionally generated by the electronically controllable brake booster 21. Due to the fact that the brake pressure $p_{31}$ in the pressure chamber 29 acts immediately upon the working surface $A_{28}$ of the master cylinder 25 or the piston 28, respectively, and the differential pressure $dp_{47}$ acts immediately upon the working surface $A_{22}$ of the movable wall 22, the following balance of forces can be established;

$$p_{31}*A_{28}=F+dp_{47}*A_{22}.$$

Due to the fact that the working surface $A_{28}$ of the master cylinder 25 or of the piston 28, respectively, as well as the working surface $A_{22}$ of the movable wall 22 are known and are generally not varying system parameters and that the brake pressure $p_{31}$ as well as the differential pressure $dp_{47}$ are continuously measured, the actuation force F which is introduced by the driver via the brake pedal 1 can be reliably and continuously determined by the electronic control unit ECU in accordance with the formula $$F=p_{31}*A_{28}-dp_{47}*A_{22} \qquad \text{(Equ. 1)}$$

without the employment of a force sensor becoming necessary.

The actuation force F which is introduced by the driver via the brake pedal 1 is thus obtained by subtracting the brake power proportion which is additionally provided by the electronically controllable brake booster 21 ($dp_{47}*A_{22}$) from the total brake power ($p_{31}*A_{28}$) provided by the brake pressure generator unit 2.

The accuracy of the actuation force F which is determined in this manner can further be increased under consideration of, among other things, friction, inertia and tension forces. This can be effected by including an additive correction value $K_A$ and/or a multiplicative correction factor $K_M$ so that the formula for the determination of the actuation force F is obtained as $$F=(p_{31}*A_{28}-dp_{47}*A_{22}\pm K_A)*K_M. \qquad \text{(Equ. 2)}$$

The electronic control unit ECU is equipped with a micro computer in a known manner, into which the formulae (Equ. 1, Equ. 2) for the determination of the actuation force F can be programmed with little effort so that a continuous calculation of the actuation force F can be carried out. With the formula (Equ. 2), in particular, a dynamic variation of the correction value $K_A$ or of the correction factor $K_M$, respectively, as a function of the operating condition of the brake pressure generator unit 2 can be carried out which results in a further increase in the accuracy.

The continuous determination of the actuation force F contributes, in particular, to an enhanced safety, as will be explained in the following.

Due to the fact that operating conditions of the braking system are evaluated by means of the generated brake pressure $p_{31}$ and the differential pressure $dp_{47}$ at the movable wall 22 there is the possibility to also monitor the sensing sensor means 31, 47 in a simple manner. For this purpose, the relation between the differential pressure $dp_{47}$ which is related to the displacement of the movable wall 22 in the axial direction and the brake pressure $p_{31}$ can be utilized. Because the sensor means 31, 47 sense at separate measuring sites and transmit the measured parameters $p_{31}$, $dp_{47}$ via separate signal paths to the electronic control unit ECU, a high degree of redundancy is ensured.

If the brake booster 21 is not electronically controlled the actuation force F which is introduced by the driver via the brake pedal 1 can be determined due to the known transmission ratio of the brake booster 21 both from the brake pressure $p_{31}$ as well as from the differential pressure $dp_{47}$ at the movable wall 22. The actuation force F can therefore be determined even in the case of a failure of one of the sensor means 31, 47 or in the case of an error, respectively, in one of the measured parameters $p_{31}$, $dp_{47}$ for the purpose of initiating an emergency braking operation or an intentional braking operation, respectively. After the commencement of the emergency braking operation or the intentional braking operation, respectively, a determination of the actuation force F, however, is no longer possible. Due to fact that, as already mentioned, monitoring of the sensor means 31, 47 and thus an error detection can reliably be carried out, the emergency braking operation or an intentional braking operation, respectively, can be executed in accordance with an error program, which, for example, shortens the maximum permissible time for an emergency braking operation or an intentional braking operation, respectively, or which reduces the vehicle deceleration which is normally set for an emergency braking operation or an intentional braking operation, respectively.

A brake pressure generator unit 2 which is equipped with an electronically controllable brake booster 21 normally comprises a safety switch which generates a logic signal and transmits same to the electronic control unit ECU. This logic signal assumes, for example, the state "B" when the driver introduces an acutation force F via the brake pedal 1, and assumes the state "A" when the driver does not introduce an actuation force F. If the electronic control unit ECU detects a change from state "A" to state "B", this indicates a termination of the actuation of the brake pedal 1 and can be utilized as a criterion for the termination of an emergency braking operation or an intentional braking operation, respectively. Because of its vital importance the safety switch is normally of redundant design. Due to the fact that in the case of the discussed braking system the actuation force F of the brake pedal 1 is determined continuously, i.e. also during an emergency braking operation or an intentional braking operation, respectively, the actuation force F or its time-dependent variation, respectively, can be utilized as a criterion for the termination of an emergency braking operation or an intentional braking operation, respectively. This is advantageous in that the termination of an emergency braking operation or an intentional braking operation, respectively, can be detected earlier than by means of the safety switch. Another advantage is that the safety switch can be designed simpler and thus at a lower cost because the redundancy is ensured via the determination of the actuation force F or its time-dependent variation, respectively.

It is essential for the braking system as shown in FIG. 1 that the actuation force F which is introduced via the brake pedal 1 can be determined continuously, i.e. even when the brake booster 21 is electronically controlled. This is of particular importance for the evaluation of so-called mixed braking operations. A pertinent example would be a driving dynamics control operation by which the stability of the motor vehicle is improved by an automatic braking operation, in particular during cornering. The automatic braking operation is initiated by electrically controlling the brake booster 21, i.e. independent of an actuation of the brake pedal 1. If, after the commencement of the automatic braking operation, i.e. during the driving dynamics control process, the brake pedal 1 is actuated, the driver's request must be evaluated in the electronic control unit ECU and a decision must be made as to whether the driving dynamics control has to continue or whether the driving dynamics control has to be aborted and an emergency braking operation or an intentional braking operation, respectively, has to be carried out. In this case, the actuation force F which is introduced via the brake pedal by the driver is a safe and reliable parameter for the decision as to whether the driving dynamics control or an emergency braking operation or an intentional braking operation, respectively, is to be assigned the higher priority. In the case of a low actuation force F, for example, the driving dynamics control process could be continued, while in the case of a high actuation force the control changes to an emergency braking operation or to an intentional braking operation, respectively.

It must also be mentioned that during an emergency braking operation or an intentional braking operation, respectively, wherein a higher brake pressure $p_{31}$ is generated via the electronically controllable brake booster 21 than would result from the actuation of the brake pedal 1, the antilock system ABS prevents locking of the vehicle wheels so that the driving stability and the steerability of the motor vehicle are maintained.

The embodiment shown in FIG. 1 employs a so-called "vacuum booster" as the brake booster 21, which is electronically controllable. In this case, the sensor 47 senses the pressure difference $dp_{47}$ at the movable wall 22 as the parameter for the electronic control unit ECU, which is related to the amplification of the brake booster 21. There is, however, the alternative to employ a so-called "hydraulic booster" as the brake booster 21, which uses a high-pressure pump as the energy source, which is driven for example by an electric motor. In this case, the pressure provided by the high-pressure pump and/or the current consumption of the electric motor could be sensed as the parameter for the electronic control unit ECU, which is related to the amplification of the brake booster 21.

What is claimed is:

1. An electronically controllable braking system for motor vehicles comprising:

a brake pressure generator unit with a master cylinder for the generation of a brake pressure;

a brake pedal via which an actuation force can be introduced into the brake pressure generator unit in order to actuate the brake pressure generator unit;

an electronically controllable brake booster either for amplifying the actuation force which is introduced via the brake pedal for the actuation of the brake pressure generator unit, or for effecting an actuation of the brake pressure generator unit;

a first sensor which senses a parameter for an amplification of the electronically controllable brake booster, a second sensor which senses the brake pressure generated by the brake pressure generator unit; and an electronic control unit that determines the actuation force which is introduced via the brake pedal from the brake pressure generated by the brake pressure generator unit and the parameter which is related to the amplification of the electronically controllable brake booster, the electronic control unit (ECU) evaluating the actuation force (F) which is introduced via the brake pedal (1) in order to decide whether a driving dynamics control process is to be continued or whether the driving dynamics control process is to be aborted and an emergency braking operation or an intentional braking operation, respectively, is to be carried out.

2. The electronically controllable braking system according to claim 1, characterized in that
the electronically controllable brake booster (21) comprises at least one movable wall (22) which can be subjected to a differential pressure ($dp_{47}$).

3. The electronically controllable braking system according to claim 2, characterized in that
the parameter ($dp_{47}$) which is related to the amplification of the electronically controllable brake booster (21) is the differential pressure ($dp_{47}$) which acts upon the movable wall (22).

4. The electronically controllable braking system according to claim 3, characterized in that
the electronic control unit (ECU) determines the actuation force (F) which is introduced via the brake pedal (1) under consideration of the working surface ($A_{28}$) of the master cylinder (25) and the working surface ($A_{22}$) of the movable wall (22).

5. The electronically controllable braking system according to claim 4, characterized in that
the electronic control unit (ECU) includes at least one correction value ($K_A$) and/or at least one correction factor ($K_M$) in the determination of the actuation force (F) which is introduced via the brake pedal (1).

6. The electronically controllable braking system according to claim 5, characterized in that
interference influences arising from friction, inertia and tension forces can be compensated by taking the correction value ($K_A$) into consideration.

7. The electronically controllable braking system according to claim 5, characterized in that
interference influences arising from friction, inertia and tension forces can be compensated by taking the correction factor ($K_M$) into consideration.

8. The electronically controllable braking system according to claim 7, characterized in that
the electronic control unit (ECU) continuously determines the actuation force (F) which is introduced via the brake pedal (1).

9. The electronically controllable braking system according to claim 1 wherein said electronically controllable brake booster is one of a vacuum booster and a hydraulic booster.

10. An electronically controllable braking system for motor vehicles comprising:
a brake pressure generator unit with a master cylinder for the generation of a brake pressure;
an electronically controllable brake booster for applying an input force to the brake pressure generator unit in order to actuate the brake pressure generator unit;
a brake pedal via which an actuation force can be introduced via the electronically controllable brake booster into the brake pressure generator unit in order to actuate the brake pressure generator unit;
a first sensor which senses a parameter for an amplification of the electronically controllable brake booster,
a second sensor which senses the brake pressure generated by the brake pressure generator unit; and
an electronic control unit that determines the actuation force that is introduced via the brake pedal from the brake pressure generated by the brake pressure generator unit and the parameter which is related to the amplification of the electronically controllable brake booster, wherein, during a driving dynamics control process, the electronic control unit evaluates the actuation force which is introduced via the brake pedal in order to decide to perform one of continuing the driving dynamics control process and aborting the driving dynamics control process.

11. The electronically controllable braking system according to claim 10, wherein, during a driving dynamics control process, the electronic control unit evaluates the actuation force which is introduced via the brake pedal as a factor in deciding to perform one of continuing the driving dynamics control process and aborting the driving dynamics control process to begin an emergency braking operation.

12. The electronically controllable braking system according to claim 10, wherein, during a driving dynamics control process, the electronic control unit evaluates the actuation force which is introduced via the brake pedal as a factor in deciding to perform one of continuing the driving dynamics control process and aborting the driving dynamics control process to begin an intentional braking operation.

13. The electronically controllable braking system according to claim 10, wherein said electronically controllable brake booster is one of a vacuum booster and a hydraulic booster.

14. An electronically controllable braking system for motor vehicles comprising:
a brake pressure generator unit with a master cylinder for the generation of a brake pressure;
a brake booster for applying an input force to the brake pressure generator unit in order to actuate the brake pressure generator unit;
a brake pedal via which an actuation force can be introduced via the brake booster into the brake pressure generator unit in order to actuate the brake pressure generator unit;
a first sensor which senses a differential pressure of the brake booster;
a second sensor which senses the brake pressure generated by the brake pressure generator unit; and
an electronic control unit that determines the actuation force that is introduced via the brake pedal from the brake pressure generated by the brake pressure generator unit and the differential pressure of the brake booster, the electronic control unit further being programmed with the known transmission ratio of the brake booster and performing error detection monitoring of said first sensor and said second sensor to detect a error.

15. The electronically controllable braking system according to claim 14, wherein said electronic control unit uses an error program to control a braking operation when an error is detected and the braking operation is commenced.

16. The electronically controllable braking system according to claim 15, said electronic control unit being programmed with at least one of a maximum permissible time for an emergency braking operation and a vehicle deceleration which is normally set for an emergency braking operation, said error program controlling an emergency baking operation, when an error is detected and the emergency braking operation is commenced, to do one of shortening said maximum permissible time for the emergency braking operation and reducing said vehicle deceleration which is normally set for the emergency braking operation.

17. The electronically controllable braking system according to claim 15, said electronic control unit being programmed with at least one of a maximum permissible time for an intentional braking operation and a vehicle deceleration which is normally set for an intentional braking operation, said error program controlling an intentional baking operation, when an error is detected and the intentional braking operation is commenced, to do one of shortening said maximum permissible time for the intentional braking operation and reducing said vehicle deceleration which is normally set for the intentional braking operation.

18. The electronically controllable braking system according to claim 14, wherein said brake booster is one of a vacuum booster and a hydraulic booster.

* * * * *

UNITED STATES PATENT AND TRADEMARK OFFICE
CERTIFICATE OF CORRECTION

PATENT NO. : 6,033,039
DATED : March 7, 2000
INVENTOR(S) : Werner Dieringer

It is certified that error appears in the above-identified patent and that said Letters Patent are hereby corrected as shown below:

In item [63] on the cover page of the patent, change the date "May 22, 1996" to --May 21, 1997--.

Signed and Sealed this

Eighth Day of May, 2001

*Attest:*

NICHOLAS P. GODICI

*Attesting Officer*   Acting Director of the United States Patent and Trademark Office